Nov. 28, 1961 K. R. SCHNEIDER ET AL 3,010,864
ART OF ARTICLE FEEDING
Filed Oct. 1, 1956 8 Sheets-Sheet 1

INVENTORS
Kurt R. Schneider
Attwood K. Howes and
Walter C. Hein
BY
Mason, Porter, Diller + Stewart,
Attorneys.

FIG 4

Nov. 28, 1961    K. R. SCHNEIDER ET AL    3,010,864
ART OF ARTICLE FEEDING
Filed Oct. 1, 1956    8 Sheets-Sheet 7

*INVENTORS*
Kurt R. Schneider
BY    Attwood K. Howes and
Walter C. Hein

*Attorneys*

INVENTORS
Kurt R. Schneider
Attwood K. Howes and
Walter C. Hein

United States Patent Office
3,010,864
Patented Nov. 28, 1961

3,010,864
ART OF ARTICLE FEEDING
Kurt Rudolf Schneider, Bainbridge, N.Y., Attwood K. Howes, Clarks Summit, Pa., and Walter C. Hein, Vestal, N.Y., assignors to Eureka Specialty Printing Company, Scranton, Pa., a corporation of Pennsylvania
Filed Oct. 1, 1956, Ser. No. 613,097
7 Claims. (Cl. 156—64)

This invention relates to the controlled feeding of articles, and is particularly useful for the feeding of associated articles such as the label areas of label sheets or strips.

A feature of the invention is the provision of an article feeding apparatus in which an intermittent feeding device is effective for procuring the advancement of a series of articles until one is in position for delivery, and means are provided for control by an article for effecting the rejection of the article from a normal delivery operation.

Another feature is the provision of an apparatus for intermittent feeding of sheets or strips of labels to a delivery position, and having means for presenting articles such as envelopes or other label receptors, means for delivering a label from the sheet or strip onto the receptor, means for procuring adhesion of the label to the receptor, and control means responsive to ready envelopes for procuring the feeding, delivery, and adhesion.

Another feature is the provision of a label feeding and severing apparatus, in which parts of the severing structures are employed for guiding and controlling the labels.

Another feature is the provision of a label feeding and severing apparatus, in which a cyclically operating driving system is effective for procuring feeding and severing movements, and in which the feeding can be correlated to the label size and the desired position for severing.

With these and other features as objects in view, illustrative practices are shown on the accompanying drawings, in which.

Figure 1:
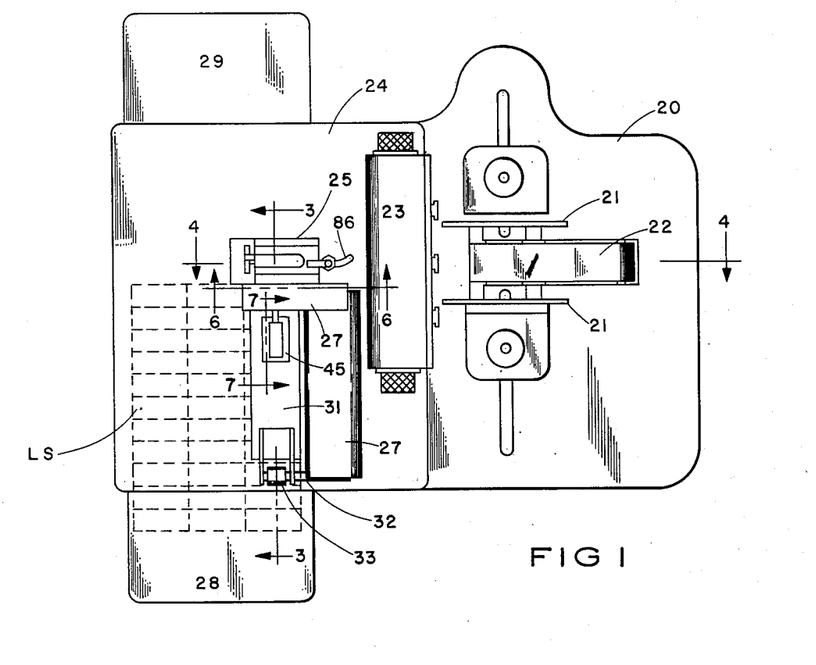
FIG. 1 is a top view of a labelling machine embodying the invention.
Figure 2:
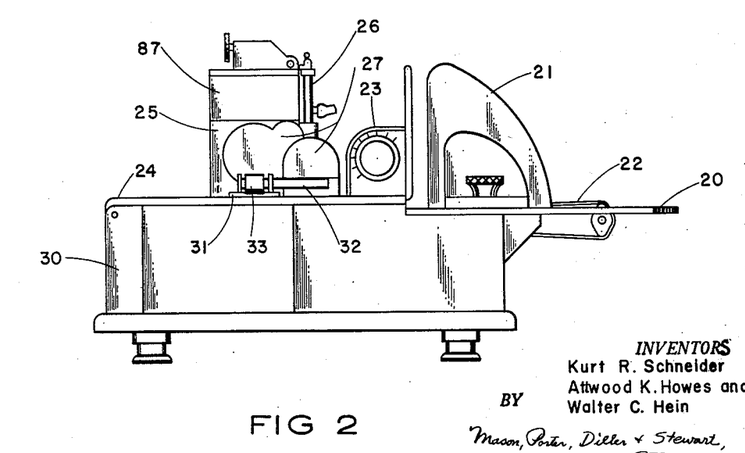
FIG. 2 is a side elevation thereof.

In FIGS. 1 and 2, the invention is shown as incorporated in a machine which sequentially feeds envelopes or other label receptors, and sequentially feeds gummed labels and severs and delivers the same upon the envelopes; together with interlocking controls so that a fresh label strip or sheet is advanced without envelope feeding until the severing device can cut a label with assurance it will be accurately delivered to an envelope, so that thereafter an envelope is only fed forward when a label is presented for delivery thereto, and so that no label is severed for application to an envelope until and unless an envelope is ready to be presented for receiving such labels. Such a machine is shown in the Schneider Patent 2,754,022.

Hereinafter, "envelopes" will be employed to refer to various receptors including empty and full envelopes, mailing and other cards, folders, packages and other articles.

In the illustrated form, a front table 20 has thereon adjustable wing plates 21 between which may be placed a stack of envelopes, with the bottom-most lying upon a feed belt 22 which urges it toward separator devices which are here conventionalized as including parts within a housing 23. Such feeding and separating devices are described in detail and claimed in the Schneider, Hein and Hein, application, Ser. No. 596,980, filed July 19, 1956, now Patent No. 2,907,567, issued October 6, 1959. The individual envelopes are fed one at a time, under control of devices set out hereinafter, so that they move beneath a rear table 24 and pass below a punch located in the housing 25, after wetting of a predetermined area by water from a valved duct 26. The rear table has a housing 27 within which are parts of a driving system which will be set out hereinafter. Extensions 28, 29 are secured to the hollow machine base 30 and have their tops at the level of the rear table 24, to provide support for a label sheet LS shown in one position by the dotted lines in FIG. 1.

A top label guide 31 is supported by the stub shaft 32 mounted on the housing 27, and overlies one row of labels of the sheet LS. A rotatable rubber faced roller 33 can turn freely on the shaft 32.

Figures 3, 12, 14:
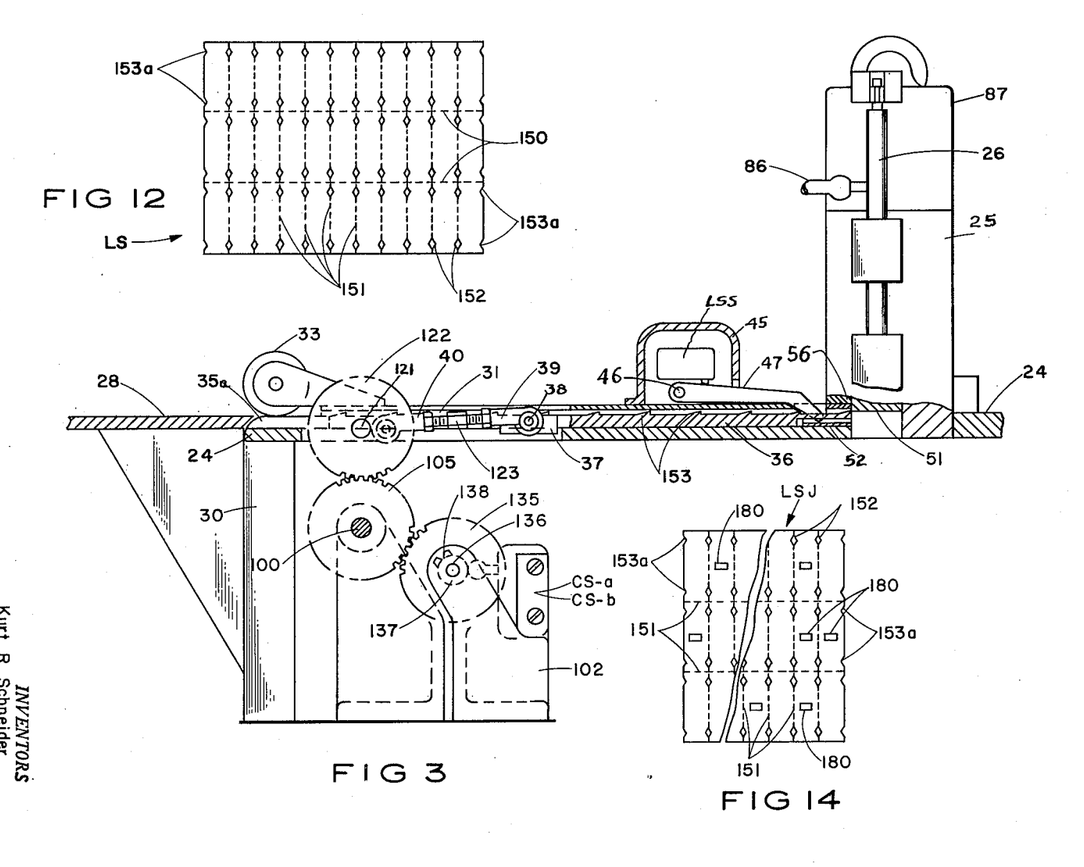
FIG. 3 is an upright section, on a larger scale, substantially on line 3—3 of FIG. 1.
FIG. 12 is a view of a label sheet.
FIG. 14 is a view of a label sheet having "rejected" label areas.
Figure 5:
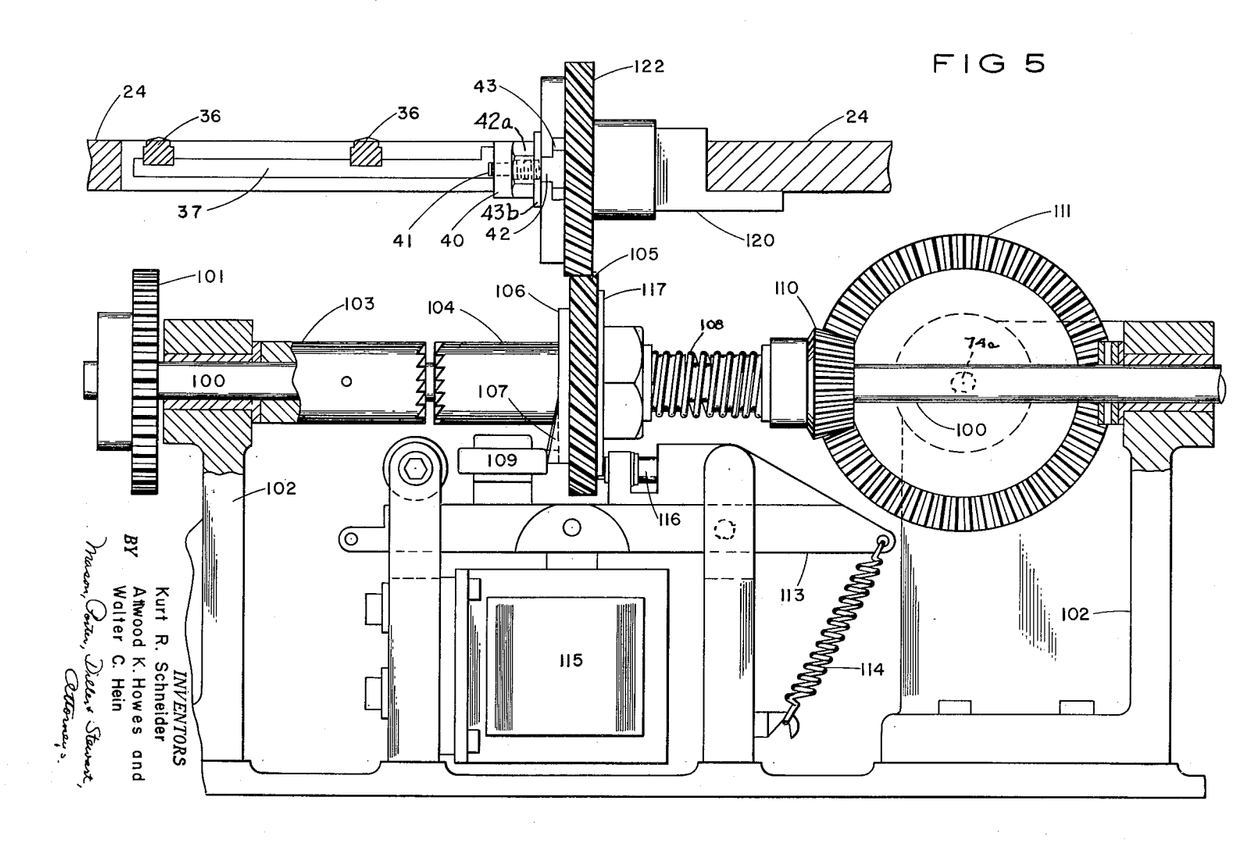
FIG. 5 is an upright view, on a larger scale, of a cyclically operating driving system.
Figure 6:
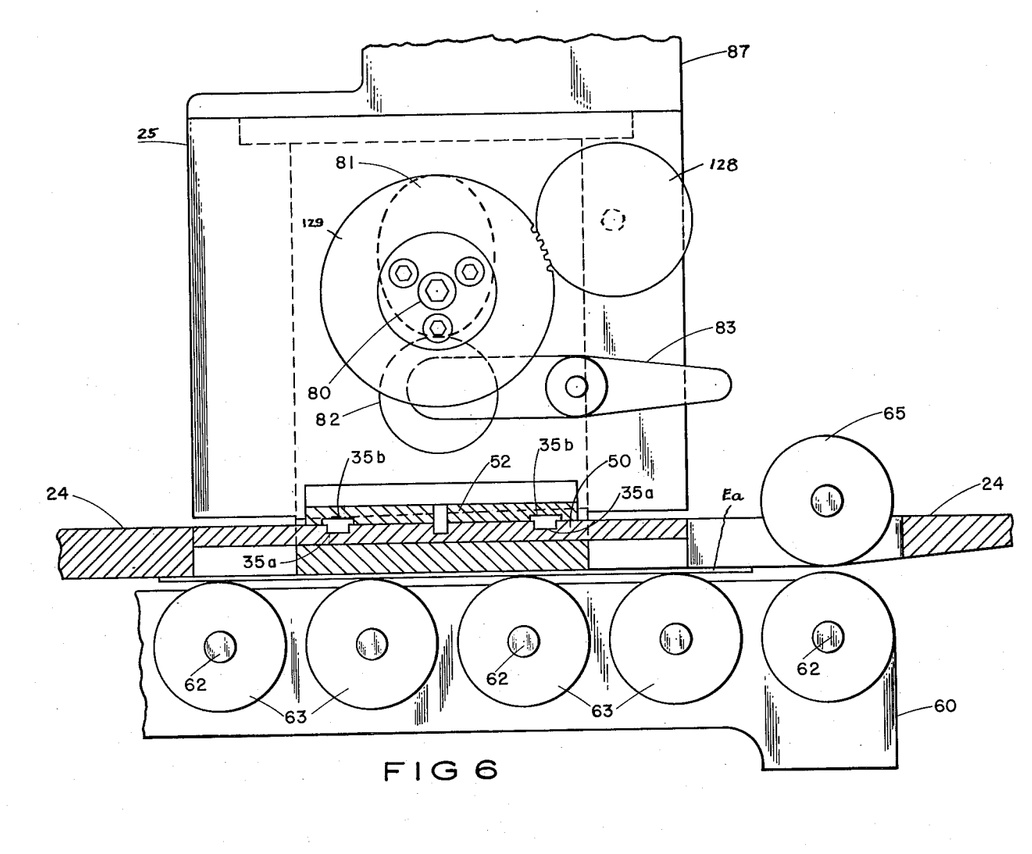
FIG. 6 is an upright section, on a large scale, substantially on the line 6—6 of FIG. 1.
Figures 8, 13:
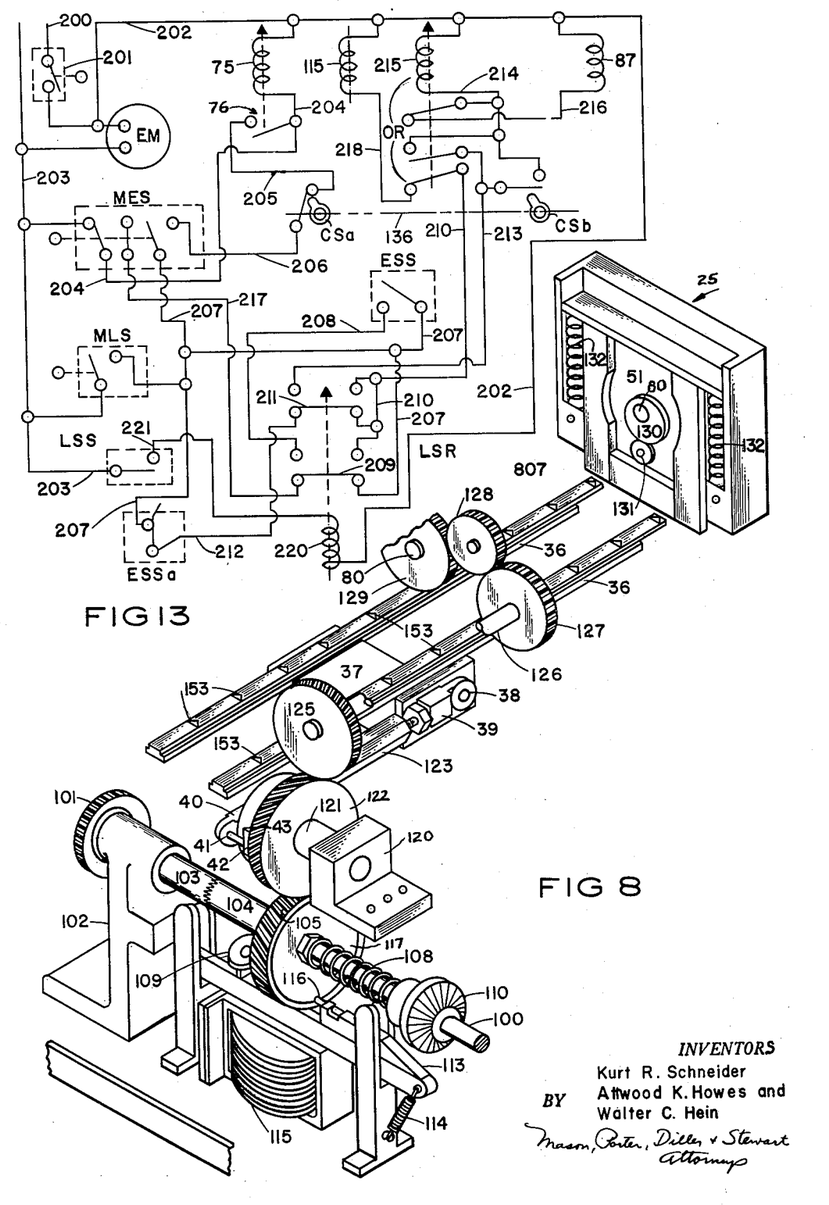
FIG. 8 is a perspective view, with table and cover parts omitted, showing the driving system for the feeding and severing devices.
FIG. 13 is a circuit diagram.

As shown in FIG. 3 and 6, the table 24 has two grooves 35a in its top, for guidedly receiving the shuttle bars 36, FIGS. 3 and 8 which are connected by a cross-head 37 which has a projecting pivot 38 engaged by one pitman end 39. A central turnbuckle element 123 connects the pitman ends 39, 40. The other pitman end 40 is driven by a crank pin 41 carried by a block 42 mounted in a radial T-slot (FIGS. 5 and 8) on the gear 122 described below: when the gear 122 makes one revolution, the shuttle bars are moved forward and back through a cycle of movement. The block 42 may be moved along the radial slot 43 for changing the radial distance of the crank pin 41 from the axis of the shaft 121 and thus changing the length of the pitman stroke; the block 42 being secured in adjusted position by the nut 43a (FIG. 5) on a threaded portion of the pin 41 and acting through the washer 43b which bears on the left-hand face (FIG. 5) of the gear 122 to draw the block 42 against the undercut surfaces of the T-slot and clamp the block against movement.

Figures 7, 7A:
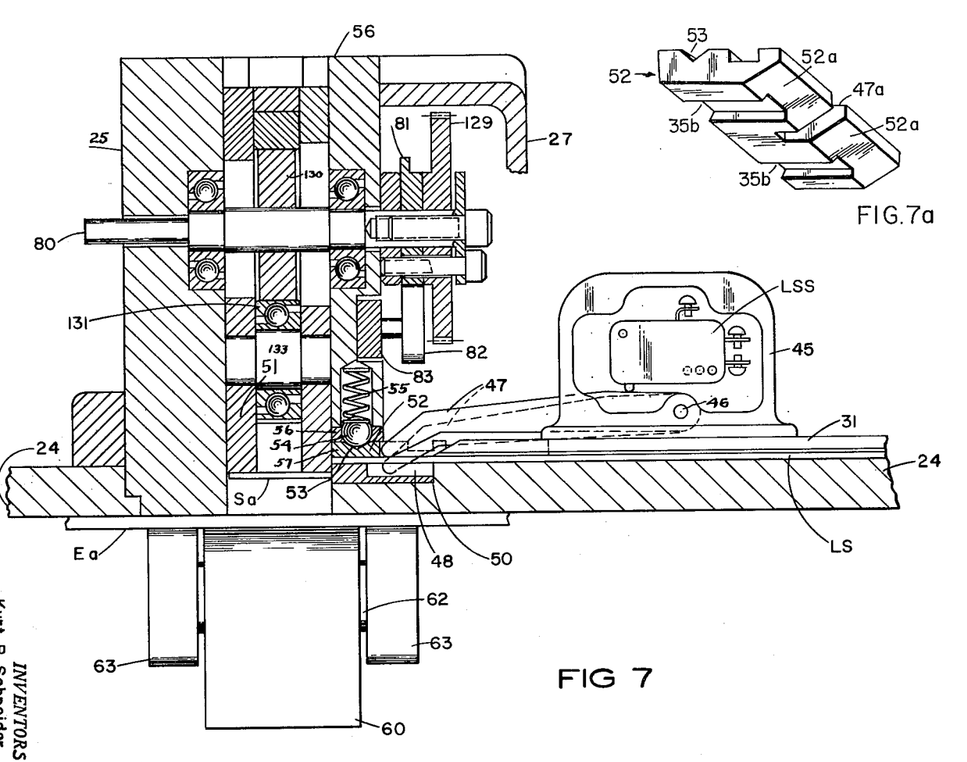
FIG. 7 is an upright section, on a large scale, substantially on line 7—7 of FIG. 1.
FIG. 7a is a perspective view of a label locating plate.

On the label top plate 31, FIG. 7, is mounted a housing 45 for a label sensing switch LSS. The housing has a pivot 46 for a label sensing finger 47 which (FIG. 1) overlies in the illustrative form the center of width of the column of labels which moves beneath the top plate 31 when the shuttle bars operate. In the absence of a label beneath the free end of the sensing finger 47, being the dotted line position of FIG. 7, this finger end lies below the table level, in a recess 48: when a label sheet LS has a complete label beneath this finger end, it is in the raised position shown by full lines.

As shown in FIGS. 6 and 7, the housing 25 is securely fitted to the table 24, and the recess 48 is provided in the inset block 50 which provides a stationary cutting edge cooperative with the punch 51 for severing the end label Sa from a column of labels indicated by the strip LS in FIG. 7, so that the continued downward movement of the punch 51 can deliver the severed label Sa upon the envelope Ea passing therebeneath with its gummed lower surface upon a pre-wetted area thereof. The label top plate 31, FIG. 7, has a beveled edge which fits beneath the edge of a hold-down plate 52 having an opening for the finger 47. The plate 52 has a top groove 53 (FIGS. 7 and 7a) for receiving one or more balls 54 (FIG. 7) pressed downward by spring means 55 and guided in a closing plate assembly 56 for the housing 25: these balls locate the hold-down plate 52 accurately relative to the punch 51 and other parts, but permit its quick withdrawal and replacement by engagement with the groove 53 thereof. The upper face of block 50, FIG. 6, has the grooves 35a for receiving the shuttle bars 36: and the lower face of the plate 52 has cooperating grooves 35b for upwardly projecting parts of the shuttle bars, so that these bars can advance the last label of a column accurately into position beneath the punch 51.

Below the rear table 24 and the housing 25 is a stage frame 60 which is urged upwardly by springs at its ends, as shown by spring 61 in FIG. 4. This stage frame has a number of shafts 62 journaled therein, each shaft having fixed thereon the stage rollers 63, FIGS. 4, 6 and 7, which are spaced laterally relative to the part of the envelope Ea which moves beneath the punch 51. These stage rollers are positively driven as taught in Patent 2,754,022 and serve to advance the envelope Ea beneath the rear table 24 while pressing it upwardly thereagainst. Top counter rollers 65 are journaled on the table 24 above the first stage rollers 63. The stage frame 60 also supports a sliding member 66 which can be positioned at a selected point of the length of the stage and supports an envelope sensing switch ESS, which is actuated when an envelope during its feeding movement encounters the switch finger 67. A second envelope sensing switch ESSa is mounted fixedly on the stage frame 60 and is actuated when a moving envelope encounters its actuating finger 68a.

Figure 4:
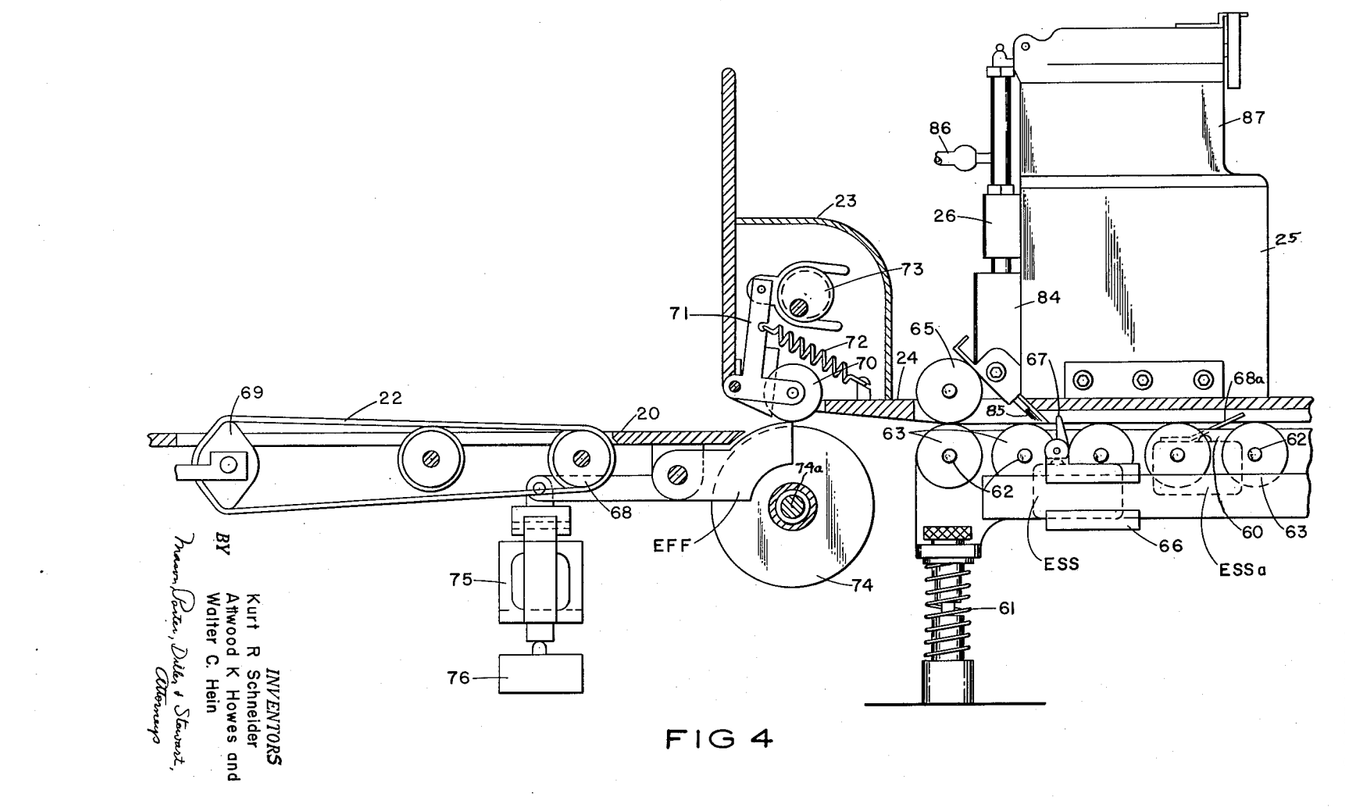
FIG. 4 is an upright section, on the scale of FIG. 3, substantially on line 4—4 of FIG. 1.

The envelope feeding system illustratively includes the belt 22 passing around rollers 68, 69, of which the roller 68 is positively driven during envelope feeding; separator devices in the housing 23, of which one element is shown in FIG. 4 as including a roller 70 supported by a lever 71 and pressed downward by a spring 72 under control of an adjustable cam 73; a main feed roller 74 is located to engage the lower surface of the envelope while being fed forward, and is then positively driven so that it advances the envelope for engagement by the rolls 63, 65; envelope feed control fingers EFF are effective in the raised position shown for preventing envelope feeding but can be lowered under control of the solenoid 75 to permit the envelope feeding. The solenoid 75 controls a switch 76 (FIG. 13) for closing a circuit when the solenoid is energized. Such illustrative receptor feeding structures are set out in detail and claimed in copending application Ser. No. 596,980, filed July 10, 1956, now Patent No. 2,907,567, issued October 6, 1959.

As the envelope actuates the envelope sensing switch ESS, electrical circuits and mechanical parts are made effective, as described below, to cause a shaft 80, FIG. 6, to rotate a cam 81 so that a cam follower roller 82 on lever 83 is moved, and therewith a wetting device body 84 is moved down and up in a cycle determined by the shaft 80 and its cam 81. This body 84 carries a wetting brush 85, FIG. 4, which thereby is effective for wetting a part of the top surface of the passing receptor, illustratively the face of an envelope, for a width and length corresponding to the size of the label to be applied. Water is delivered to the brush from a duct 86, FIGS. 1 and 4, under control of a valve conventionally shown by its body 26, when a solenoid 87 is energized. These wetting parts are shown conventionally, as their specific arrangement forms no part of the invention claimed herein: this invention is concerned with having means such as a wetting system by which the label is caused to adhere to the receptor at a proper place thereon.

Mechanical driving parts are shown in FIGS. 5 and 8 as including a shaft 100 to which is fixed a gear 101 driven by a source of power such as a constantly running electric motor EM (FIG. 13). This shaft 100 is supported in bearings in the standards 102, and has a toothed clutch sleeve 103 fixed thereon. A cooperating toothed clutch sleeve 104 is slidable and rotatable relative to the shaft 100 and is secured to a helical gear 105 and a clutch plate 106 having an axially projecting ramp 107. A spring 108 urges the sleeve 104 toward engagement with the sleeve 103. These sleeves are held apart between cycles of operation by the follower roller 109 in engagement with the ramp 107: such position is shown in FIG. 5. The shaft 100 is also fixed to a bevel gear 110 which is in mesh with a bevel gear 111 on the shaft 74a (FIGS. 4 and 5) of the main feed roller 74 so that the latter can be driven at constant speed during envelope feeding, and the feed roller shaft is connected for driving the stage rolls 63, the feed belt roller 68 and other parts, as set out and claimed in the said copending application Ser. No. 596,980, filed July 10, 1956. The follower roller 109 is rotatably carried by a lever 113 which is urged clockwise by a spring 114, into position opposite the path of the ramp 107, and can be moved downwardly in a counterclockwise direction about the lever pivot, to withdraw roller 109 from the ramp 107, by a solenoid 115. Thereupon, the sleeve 104 is moved to the right by the spring 108 and its teeth engage the teeth of sleeve 103 and driving of the sleeve 104, gears 105, 122, and other parts of an intermittently driven system begins and continues, this leftward movement of sleeve 104 with gear 105 and plate 117 removing the plate 117 from the spring-pressed stop pin 116 which has been in a notch of this plate 117 as shown in FIG. 5: when the clutch solenoid 115 is deenergized, the spring 114 rocks the lever 113 so that the follower roller 109 is brought into the path of the ramp 107 and, toward the end of a cycle of revolution of the gear 105 and plate 117, the ramp 107 rides on the roller 109 and moves the sleeve 104 toward the right and the plate 117 engages the end of the stop pin 116 and moves it toward the right: the clutch teeth of sleeve 103, 104 are disengaged and at the end of the cycle, the stop pin 116 reenters the notch of the stop plate. This structure of a clutch effective for engaging for a revolution of the shaft 100 and then disengaging is set out in detail and claimed in the Schneider application, Ser. No. 597,150, filed July 11, 1956, now Patent No. 2,915,160, issued December 1, 1959. When closed, the clutch can procure a single or integral number of revolutions of the gear 105, and then bring this shaft to a standstill at the initial position by engagement of a stop pin 116 carried by lever 113 in a notch of the stop plate 117 fixed to the sleeve 104.

A bearing block 120 secured to the rear table 24, FIG. 5, supports a rotating shaft 121 (FIGS. 3 and 8) upon which is fixed a helical gear 122 of the same effective diameter and in mesh with the gear 105: a face of gear 122 has the T-slot 43 described above, so that the pivot pin 41 makes one revolution during a revolution of gears 105, 122. Thus the pitman ends 40, 39 (FIGS. 3 and 8) are caused to perform one cycle of movement; with the length of stroke of movement determined by the adjusted radial distance of the pin 41 from the axis of shaft 121, and the end positions of the cyclic strokes determined by the adjustment of the central turnbuckle portion 123 of the pitman, which is effective to control the distance between the pivots 41, 38: thus the end of the feeding strokes of the shuttle bars 36 can be accurately determined relative to the punch 51.

A third helical gear 125 (FIG. 8) of the same effective diameter as the gear 122 is in mesh therewith and fixed on a rotatable shaft 126 which is supported in the housing 27, and is connected to the gear 127. The gear 127 is in mesh with an idler 128 and thence drives the gears 129 fixed to shaft 80 for driving the cam 81 (FIG. 7) for the wetting device and the cam 130 (FIG. 8) for the punch 51. The follower roller 131 for cam 130 is journalled on the punch 51: and springs 132 (FIG. 8) are effective between shoulders on the punch housing 35 and on the punch, for lifting the punch and holding the follower 131 against its cam.

In FIG. 7, the follower 131 is shown as an antifriction roller supported by the pin 133 carried by the punch 51. The gear ratio from shaft 126 to shaft 80 is 1:1, so that the shaft 80 and its cams also performs a single rotation for a rotation of the sleeve 104.

In FIG. 3, a helical gear 135 is supported by a standard 102 and is in mesh with the gear 105 of the same effective diameter. The shaft 136 fixed to the gear 135 is thus rotated once for each rotation of the sleeve 104, and carries cams 137, 138 (FIGS. 3 and 13) for actuating switches CS–a, CS–b in a prescribed sequence, as described hereinafter, during cycles of movement.

The illustrative label sheet LS in FIGS. 1 and 12 is shown as having three columns of label areas, so that a first column can be introduced beneath the roller 33 and the label top plate 31 (FIGS. 1, 2 and 3). The successive label areas can be shaped as shown in FIG. 12, with the dotted lines 150 illustratively delimiting the columns, and dotted lines 151 the label areas in the columns. These dotted lines can be present as weakenings or small perforations on the label sheet. Adjacent label areas of each column have the apertures 152 of diamond shape, which extend for limited distances into the margins of the label areas, these apertures being spaced for each label area boundary, in correspondence to the spacing of the projections 153 on the shuttle bars 36, with the apertures for the successive label areas alined in the direction of sheet feeding and with provision of half-diamonds 153a at the rear edge of the sheet in like alinement; for symmetry so that the sheet may be introduced with either edge first, depending upon the selection for envelope positioning, the half-diamonds 153a are preferably present at both front and rear edges.

The shuttle bars 36 are shown as having the triangular upward extensions 153 for engaging the label apertures 152 in succession, and thereby effecting forward feeding of the label column by label distances at each cycle of movement of the shuttle bars 36, with the label top plates 31, 52 detaining the advanced sheet during the return stroke of the shuttle bars. The grooves 35b, FIG. 6, in the plate 52 permit the extensions 153 at the ends of the shuttle bars to push the last label accurately beneath the punch 51.

Figure 9:
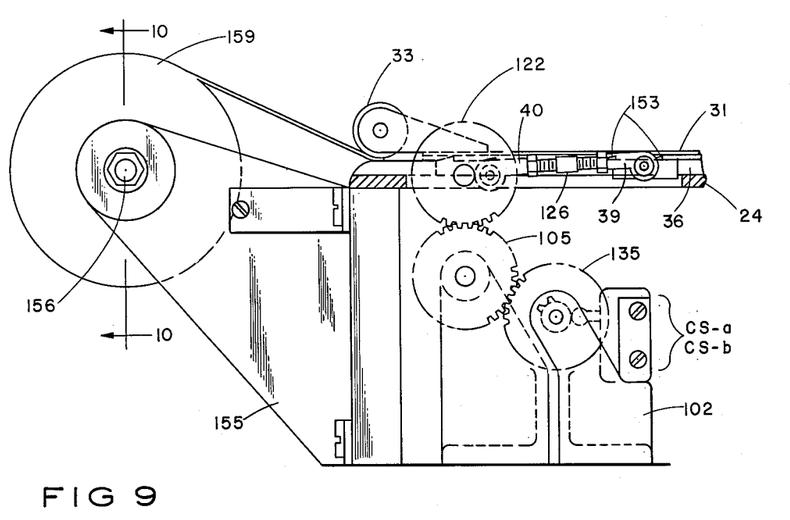
FIG. 9 is a view, corresponding to a part of FIG. 3, of a modified label supplying structure.
Figure 10:
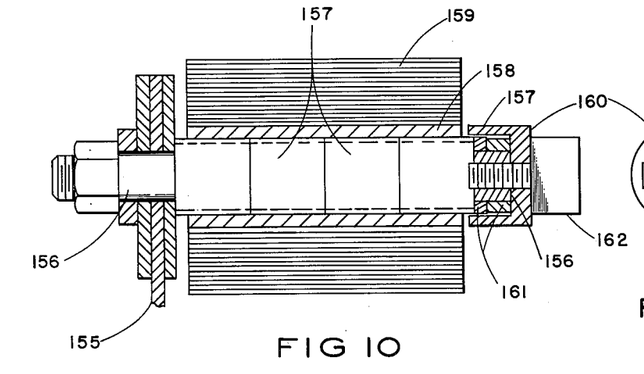
FIG. 10 is a section on line 10—10 of FIG. 9, at a larger scale.
Figure 11:
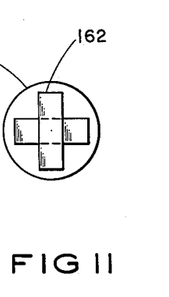
FIG. 11 is an end view of a part in FIG. 10.

The same general mechanisms can also be employed with labels in other forms than connected three-column sheets of letter paper size, as illustrated by FIGS. 9–11. In FIG. 9, the table extension 28 of FIG. 1 has been omitted, and a bracket 155 supports a rod 156 upon which can be placed the interchangeable bushings 157 (FIG. 10) of outside diameters corresponding to the internal diameter of hollow cores 158 upon which are wound rolls 159 of labels. These rolls may have the width of one or more columns of label areas, with apertures at the margins of adjacent areas in each column, as described above. The end nut 160, FIGS. 10 and 11, is engaged with the rod 156 to hold the parts in position, noting that its skirt 157 is of diameter to come opposite the core 158, and that the washers 161 can clamp the bushings 157. The knob 162 permits manual engagement and disengagement of the nut 160. With this arrangement, the single column, or the first of a number of columns, of labels in the roll 159 is roughly alined with the shuttle bars 36 and is brought under the roll 33 and the label top plate 31 until the projections 153 of the shuttle bars engage perforations of this column, and thereafter the feeding is automatic with the projections acting to aline the column accurately for presentation of the successive labels beneath the punch 51.

*Label rejection*

Label sheets LS and rolls 159 are usually prepared in multiple copies for several mailings to the listed persons during an advertising campaign. Thus, for example, by using carbon papers, five identical sheets LS may be prepared. One of these sheets is used for the first mailing, another for the second, etc. In such campaigns, material for the successive mailings is frequently prepared on the premise that no response has been received to the early mailing or mailings: and hence it is a waste to send the later matter to customers who have already responded. Instead, different mailing material is addressed as "follow-ups" to existing customers.

Likewise, when errors are made upon the label areas, for example in typing, it is a time-consuming and expensive operation to make corrections: and far cheaper if the typist can stop work on a label area where a misprint has occurred, and immediately start typing a correct label. Due to the random location of such labels, the label areas themselves cannot be removed from the sheets or rolls without gross mutilation which would frequently require hand feeding of one or a couple labels by hand.

The machine and circuiting described permits the rejection of labels, whether in sheets or rolls, to avoid addressing envelopes for sending the material to selected persons; and to effect rejecting of labels which have typographic error other other defeat. This selection for exclusion and rejection is accomplished by punching holes 180 (FIG. 14) in the areas of labels which are not to be placed on envelopes. That is, in the conduct of a campaign, the label sheets or rolls intended for second, third, etc. mailings of a series can have such holes punched in the remaining sheets for the series: thus some labels will be punched before the second mailing, more before the third, etc., so that each sheet is "current" before the application of its labels to envelopes begins.

When a label sheet or roll having one or more such label areas marked for rejection by holes 180 is placed in the machine, the label feeding occurs as before. Assuming that the first label of a column is proper to be used, the machine senses this by the finger 47 which is raised and held (FIG. 7, full line position) and the envelope feeding fingers EFF (FIG. 4) are lowered to release an envelope. When this first envelope passes the fingers, and is advanced by the stage rollers 63, it engages the envelope sensing switch finger 67 which closes the envelope sensing switch ESS, which procures closure of the clutch 103, 104; and the operations of label feeding, of wetting the envelope and of the severing descent of the punch 51 with delivery of the detached label onto this first envelope, etc. occur as before. During the cycle of the shafts 100, 136, the clutch solenoid 115 is denergized and the clutch is opened as before. If the next label of the column is proper to be used, then upon its advancement during the above cycle of feeding the first label, the label sensing switch LSS remains closed, and the circuit through solenoid 75 remains broken, so that the envelope fingers EFF permit a second envelope to move forward to the stage system. This continues as long as "proper" labels are advanced for controlling the label sensing switch LSS.

When, during any label feeding movement, a label having a hole 180 therein is advanced into the ready position beneath the finger 47, so that the label sensing switch LSS opens after the passage of the leading edge of such label, then the relay LSR is deenergized and its contacts moved to the lower position. Therewith, if the machine is operating under fully automatic conditions, the circuit through solenoid 75 is established, and envelope feed fingers EFF prevent envelope feeding so that no envelope is supplied for this "reject" label. Also, the relay LSR when opened closes a circuit through the clutch solenoid 115, so that a cycle of intermittent movement is initiated without need fo movement of switch ESS; and therewith this improper or "reject" label is advanced to position beneath the punch, and the punch operates to sever it. Since no envelope has been fed, there is no wastage of the mailing matter, but only the discarding of this "reject" label.

If the succeeding label area, after a "reject" label, is proper for delivery to an envelope, then this proper label raises the finger 47 during the aforesaid advancement of the "reject" label, and this finger 47 is held raised during the completion of the cycle. Hence, the switch LSS is closed, the relay LSR operated and solenoid 75 is deenergized, so that an envelope is now allowed to move forward in the machine, and therewith a further cyclic movement is initiated by this envelope with application of this "proper" label upon such envelope.

Further, when two successive improper or "reject" label areas are on the label column, for example, the finger or lever 47 of the label sensing switch LSS is first raised for closing the switch LSS during the feeding of the first "reject" label area and is held raised for the time of passage of the parts of the first and second labels which contact the lever 47 and extend across the boundary between these two labels, that is, the remaining parts of the column between the two successive holes 180. Thereafter, the lever 47 sinks into the hole 180 of the second label. During the interval of time for which the lever 47 is raised, when the machine is operating at high speed, with short time intervals permissible for the mechanical movements of the control devices, the circuits and parts may have effected a momentary deenergization of the solenoid 75, so that an envelope is permitted to start over the feed roller 74; but shortly thereafter the descent of the lever 47 into the hole 180 of the second "reject" label area, effects the reenergization of solenoid 75, so that the fingers EFF are raised, and stop this envelope against further feeding: at a subsequent operation initiated by the presence of a "proper" label, for example, the solenoid 75 will again be deenergized and the feeding of this envelope can continue with a possible erroneous placing of a label thereon. This possibility is prevented by the employment of a maintaining circuit for solenoid 75, which is closed at switch 76 upon energization of solenoid 75, and continues through the normally closed cam switch CSa, whereby the solenoid 75 is not deenergized immediately upon movement of the switch LSS; and relay LSR; but instead the maintaining circuit holds the solenoid 75 energized and thus prevents envelope feeding until the cam switch CSa has opened momentarily near the end of the prevailing cycle. A similar preventing action is also effected thereby as a column or strip of labels becomes exhausted, i.e. at the end of a label sheet LS.

The illustrative circuit diagram of FIG. 13 shows the connection of the electrical parts, whereby the operations are initiated and performed. Current from a supply conductor 200 flows, when a main switch 201 is closed, to the conductor 202 and thence through an electric motor EM for driving the gear 101, and returns by the other supply conductor 203. Thus the motor EM is energized and turns while the macine is ready for operation.

An operation relay OR has an actuating coil 215, and two normally closed bridges and one normally open bridge. A label sensing relay LSR is illustrated with two bridges 209, 211, each of which has both normally open and normally closed contacts. The manual envelope switch MES has a bridge for one normally open set of contacts, and a bridge with both normally open and normally closed contacts: when the switch MES is in the left-hand position, envelope feeding is inhibited, and when in right-hand position, envelope feeding can occur by the closure of the normally open contacts and by the opening of the normally closed contacts so that the solenoid 75 is deenergized. The manual label switch MLS has a bridge for normally open contacts: when the switch MLS is in left-hand position, such contacts are open, and label delivery is inhibited; when in right-hand position with the contacts closed, label feeding can occur.

A branch of conductor 202 leads to the solenoid 75, FIG. 4, and thence by conductor 204 through the solenoid switch 76 and by conductor 205 to the cyclic switch CSa, FIG. 3, which is momentarily opened by cam 137 as the end of the cycle approaches, and then closes again as the cycle is completed; thence by conductor 206 and normally open contacts of the manually closable envelope feed control switch MES, and conductor 207 to the envelope sensing switches ESS and ESSa: from switch ESS a conductor 208 leads to normally open contacts of a bridge 209 of the label sensing relay LSR and thence by conductor 210 to a further normally open contact and a further normally closed contact of a bridge 211 of the relay LSR. From the normally closed further contact of bridge 211, a circuit can extend by conductor 212 to the other contact of envelope sensing switch ESSa and to conductor 207. From the normally open further contact of bridge 211, a circuit can extend by conductor 213 to a contact of the cam switch CSb which is momentarily closed at the beginning of a cycle: a conductor 214 extends from the cam switch CSb to the coil 215 of an operation relay OR. A branch of conductor 213 leads to a normally open contact of relay OR and thence to conductor 214, thus being in shunt to the cam switch CSb, for establishing a maintaining circuit to the coil 215 when the latter has been momentarily energized by cam switch CSb and maintaining the relay OR energized after the cam switch CSb has opened. The other terminal of relay coil 215 is connected to the conductor 202. A branch of conductor 214 extends to a normally closed contact of the relay OR, thence by conductor 216 to the solenoid 87 of the water dispenser, and thence to the conductor 202.

The conductor 207 also extends to a normally closed contact of bridge 209 of the label sensing relay LSR; thence by conductor 217 to a normally open contact in the envelope feed control switch MES; and thence to conductor 204. The switch MES also has a normally closed contact connected to conductor 204, and in its position for stopping envelope feeding, closes a circuit therefrom to conductor 203. The conductor 207 also is connected to the manual label feed control switch MLS, and thence to the return conductor 203.

The conductor 202 extends to the clutch solenoid 115, thence by the conductor 218 to a normally closed contact of the operation relay OR; and thence to conductor 210.

The conductor 202 extends to the coil 220 of the label sensing relay LSR, thence by conductor 221 to the label sensing switch LSS, and to conductor 203; so that the coil 220 is energized as long as the switch LSS is closed, i.e. so long as its sensing finger 47 is in the raised position due to the presence of a proper label in position for supporting the finger 47.

For normal operation, the switch 201 is closed, and the motor M runs, for driving the main feed roller 74, and (under control of the solenoid 75), the feed belt 22, and the stage rollers 63. The clutch sleeves 103, 104 will be assumed open, that is with the intermittent drive from the motor M to the shuttle bars 36, the punch 51 and the wetting device lever 83 at a standstill: with cam switch CSa closed and cam switch CSb open. Relays LSR and OR are open, and the solenoids 75, 115 and 87 are deenergized. It will be assumed that manual switches MES and MLS are in their left hand positions (FIG. 13). With no envelopes present, envelope sensing switch ESS is open, and the secondary sensing switch ESSa closed. With no labels present, label sensing switch LSS is open.

It will be assumed that the machine has been set up for a long run of a single size and filling of envelope material, that all parts have been properly adjusted for this service and that the machine has been running, but has been shut down, empty of labels and envelopes, at the close of a shift. At the start of the next shift, operations can be resumed by inserting labels and envelopes and closing the main switch 201. That is, is such standstill condition, the main switch 201 is open, motor EM is at a standstill, manual switches MES and MLS are in their right hand or "On" positions; no labels or envelopes are in the machine; intermittent shaft 136 is at a standstill at zero in its cycle; cam switch CSa is closed and cam switch CSb is open.

A column of labels, either in a sheet LS or a roll 159 can be introduced beneath the roller 33 and the label top plate 31: and envelopes placed in position over the feed belt 22.

I

When the main switch 201 is closed, current flows by the path 200—201—202—EM—203; and the motor EM runs. The following circuit conditions also then exist:

(a) Current flow from the conductor 202 through the coil 220 of the label sensing relay LSR and by conductor 221 is interrupted at the label sensing switch LSS which is open due to the absence of a label beneath it: coil 220 is not energized, and relay LSR is in the lower or non-actuated condition.

(b) Current can flow from the conductor 202 through the clutch solenoid by the path 202—115—218—normally closed lower contacts of operation relay OR—210—normally closed contacts of bridge 211 of relay LSR—212—normally closed switch ESSa—207—closed manual label switch MLS—203; the clutch solenoid 115 is energized, the clutch closes, and the shuttle bars are reciprocated, whereby the label strip is fed forward, step-by-step, with a label distance advancement for each rotation of the shaft 100. This circuit remains closed and solenoid 115 energized, and the clutch remains closed, so that the shuttle bar reciprocation continues until the label sheet LS comes beneath the lever 47 of label sensing switch LSS, that is, the first label is ready for feeding beneath the punch: whereupon, the switch LSS is closed.

(c) Current flow by the path 202—75—204—MES—217—normally closed contacts of bridge 209 of relay LSR—207—MLS—203 can occur: solenoid 75 is energized, the fingers EFF are raised, and no envelope feed occurs in this condition.

(d) When solenoid 75 is energized, the switch 76 is closed, and a branch circuit from conductor 204 is tentatively established through switch 76—205—CSa (closed at start of cycle of the intermittent drive—206—MES—207—MLS—203: this is in parallel to condition (I–c), and also can procure energization of the solenoid 75 so that no envelopes are fed as long as this maintaining circuit is closed. When switch CSa momentarily opens near the end of the cycle, this circuit is broken and solenoid 75 is deenergized so that a second envelope can be fed: shortly thereafter switch CSa closes again.

(e) when switch LSS is closed by the presence of a proper label beneath it, current flows by the path 202—220—221—closed switch LSS—203: the coil 220 of the label sensing relay LSR is energized, the condition of (I–a) above has ceased, and current flow under condition (I–b) above ceases, so that the clutch solenoid 115 is deenergized as soon as the label closes switch LSS: the clutch continues closed until the ramp 107 encounters the now-lifted follower roller 109 and is thereby moved, along with the clutch sleeve 104, for opening the clutch, with the stop pin 116 engaging the stop plate 117 to stop the intermittent drive accurately at the zero point of cycle. Therewith the label feeding ceases.

(f) Also when relay LSR is actuated, the circuit which has been established through envelope feed solenoid 75 under condition (I–c) above is interrupted at bridge 209, so that this circuit no longer supplies the solenoid 75 and envelopes are allowed to start when this deenergization causes the fingers EFF to be lowered. However, since the switch CSa is closed at the start of the cycle of intermittent movement, the switch 76 has been closed by energization of solenoid 75; and the maintaining circuit by the path 204—76—205—CSa—206—207 for current flow through solenoid 75 continues until the momentary opening of the switch CSa shortly before the end of the cycle, whereupon energization of the coil solenoid 75 ceases, and the envelope feed fingers EFF drop, and such an envelope is permitted to move forward into the stage system until it encounters the sensing finger 67 and envelope sensing switch ESS is closed. Upon de-energization of solenoid 75, the switch 76 opens, breaking the circuit through the conductors 205, 206: so that reclosing of switch CSa cannot reenergize the solenoid 75 until this solenoid 75 has been energized by another path and its switch 76 has been closed. Hence, the fingers EFF remain down and envelope feeding can continue until the relay LSR moves back to its de-energized position, for reestablishing the condition (I–c) above.

(g) When switch ESS thus closes, a circuit is established by the path 202—115—218—normally closed contacts of relay OR—210—now closed contacts of bridge 209—208—ESS—207—MLS—203: the clutch solenoid 115 is thus energized at as position of the advancing envelope which has been predetermined by the position adjustment of the finger 67, and a label delivery cycle of the intermittent drive is started. The wetting device is actuated to wet the simultaneously pre-selected part of the top surface of the advancing envelope, and rises when this area has been wetted. The shuttle bars immediately feed the label sheet by one label width, so that the first label area comes beneath the punch 51. The punch 51 is forced down, to engage and sever this label area and deliver it through the top plate 24 onto the envelope which has advanced since the wetting operation so that its wetted area is accurately ready to receive the label Sa when the latter encounters the envelope. The punch 51 is then raised again: and the wetting and punch parts, with the label shuttle bars, return to the positions at the zero point of the intermittent drive cycle. The labeled envelope continues to advance until its trailing edge clears the switch ESS, and this switch can open again; so that the above condition (I–g) ceases, and the clutch solenoid 115 is deenergized for procuring the opening of the clutch and termination of the prevailing cycle.

(h) If the second label area, thus advanced, is proper for delivery to an envelope, the label switch LSS remains closed and the relay LSR actuated. Therewith the circuit through solenoid 75 remains broken, and a second envelope is permitted to advance. As the second envelope passes the fingers EFF and enters the stage system, it initiates condition (I–g) so that a further cycle starts, and the second label area is advanced, severed and delivered to the wetted area of this second envelope in the same fashion. This coordinated feeding of envelopes and labels continues automatically so long as both envelopes and labels are available.

(i) A current path is provided from conductor 202 via relay coil 215—214—cam switch CSb (closed momentarily shortly after the beginning of a cycle)—213—bridge 211 (when relay LSR is energized)—210—bridge 209—208—ESS—207—MLS—203: so that coil 215 is energized and the operation relay OR is actuated. This actuation opens the circuit through clutch solenoid 115 between the conductors 218 and 210 so that the solenoid 115 is de-energized as long as relay OR remains actuated. Also, activation of the relay OR closes a switch for connecting conductors 214, 213: and thus establishing a maintaining circuit for the coil 215, so that the relay OR remains energized after switch CSb opens again, and remains energized until the envelope sensing switch ESS opens again upon clearance by the envelope. Thereby, in the event that an envelope is so long that it does not leave and permit opening of the switch ESS before the end of a cycle of intermittent movement, a further energization of solenoid 115 under condition (I–g) would cause the feeding and delivery of a further label, possibly upon the same envelope, but this is prevented by the action of relay OR.

(j) The current path through the water solenoid 87 by the path 202—87—216—normally closed contacts of relay OR—214 is open at cam switch CSb. When switch CSb closes, a pulse flows to energize the solenoid 87 and deliver a predetermined quantity of water to the wetting device for maintaining the latter ready for wetting envelopes: this current flow is shortly thereafter terminated when the realy OR is actuated under condition (I–i), with the opening at relay OR of the contacts between conductors 216, 214.

(k) Upon exhaustion of labels, as when a full column of a label sheet LS or a full roll 159 has been consumed, the lever 47 of the label sensing switch LSS drops, and switch LSS opens; so that coil 220 is deenergized and relay LSR moves to its rest position as under condition (I–b), so that condition (I–c) is established, solenoid 75 is energized, and envelope feeding stops. The clutch solenoid 115 is energized, and shuttle bar reciprocation continues, so that the introduction of a new label area column beneath the label top plate 31 is immediately followed by automatic feeding of the label areas under condition (I–b).

(l) Upon exhausting of envelopes, no further envelope can be advanced for operating the envelope sensing switch ESS, and hence the clutch solenoid 115 is not energized under condition (I–g), and no label feeding occurs.

(m) When any label area having a "rejection" hole 180 comes beneath the lever 47, incidental to the shuttle bar feeding, the label sensing switch LSS is opened, and the circuit through coil 220 is broken: hence relay LSR is at rest position, and the circuit through the envelope feed solenoid 75 is energized at bridge 209 and no envelope feeding occurs. The circuit through clutch solenoid 115 is closed under condition (I–b), and a cycle of intermittent movement occurs by which this "reject" label area is advanced beneath the punch 51, severed, and delivered onto the stage, without an envelope being present to receive it. A succeeding envelope will move the rejected label along the stage and eject it from the machine, noting that it has not been brought into contact with moisture. This automatic feeding and severance of a "reject" label area occurs regardless of whether it is the first, intermediate or last label area in a column: or whether several said label areas follow one another.

(n) In the event of a closure followed by a reopening of the switch LSS during the course of a single feeding movement of a label distance, such as may occur when two "reject" labels follow one another or a "reject" label is at the trailing end of a column, as described above, then the energization of the envelope feed solenoid 75 is maintained for the early part of an intermittent cycle of movement by the path 202—75—204—76—205—CSa—206—MES—207—MLS—203; that is, for the part of the cycle during which label feeding is being accomplished. Thus, adequate timing is provided for the mechanical and electrical actions to occur, before the opening of the cam switch CSa and breaking of this maintaining circuit. Consequently, the feeding of envelopes is prevented until the cam switch CSa opens.

(o) Since the cycle of intermittent movement, with label area feeding and severing, is rapid and occupies only a part of the time for advancement of an envelope past the punch 51, that is, during the closure of the first envelope sensing switch ESS, the feeding and severance of a proper label area can be followed under condition (I–m) by the detection of a "reject" label area with the starting of a new intermittent cycle before the envelope has cleared, so that the "reject" label may be applied to a later wetted area of this envelope. This is avoided by the second envelope sensing switch ESSa, which is positioned down-streamward of the first switch ESS, that is, for actuation by the envelope while the latter is still passing the point of label delivery, and is of normal closed type. This switch ESSa holds the circuit from conductor 212 to conductor 207 closed under condition (I–b) at the start of a cycle: but is opened by envelope contact, so that the solenoid 115 cannot be closed therethrough, and hence the start of a new cycle is prevented until the passing envelope has cleared switch ESSa, whereupon the circuit closes again and solenoid 115 is energized for the cycle which feeds and severs the "reject" label, noting that no envelope feeding is required to start the cycle and that the solenoid 75 is then energized so that no envelope can be fed.

This fully automatic operation continues so long as both envelopes and labels are present for use, the successive envelopes being fed and moistened, and the labels delivered thereto in succession.

Upon failure of envelopes, label feeding stops and the intermittent drive remains at a standstill following the close of a cycle, until envelopes have again been placed in the machine; whereupon the bottom envelope of the new stack is fed through the machine, and the full automatic running resumes. It is also possible to handfeed envelopes one by one, producing an automatic movement of each envelope through the machine, with the proper automatic delivery of a label thereto.

If the labels become exhausted, envelope feeding stops. The shuttle bars move. When a label sheet or strip is introduced: this label sheet is fed forward until a label is ready for advancement beneath the punch; and thereupon full automatic operation resumes.

II

*Manual label feed control running*

This differs from full automatic running, in that label movements can be effected, but no delivery of envelopes occurs. Hence, this condition can be employed by the operator to make sure of accurate label deliveries. For this condition, the envelope hand switch MES is moved to the left hand position, that is, opening the contacts between conductors 206, 207; while the label hand switch MLS is closed. The following circuits and tentative circuits are established:

(a) 202—75—104—MES—203: 75 is held energized and no envelopes are fed.

(b) Solenoid 75 closes its contacts 76 but without effect as the circuit 205—206 is open at CSa.

When cam switch CSa momentarily opens during the cycle, no effect occurs.

(c) 202—115—218—bridge of relay OR—210—bridge 211—212—ESSa—207—MLS—203; solenoid 115 is energized: intermittent cycles continue until LSS is moved, so that coil 220 is energized, and bridge 211 of relay LSR moves. Hence, if a label sheet is introduced, it is automatically stepped forward until LSS changes: this occurs near midpoint of cycle, while the shuttle bars are moving forward with the label. Then the shaft 100 and the bars stop at end of the existing cycle.

(d) 202—215—214—213 is open both at cam switch CSb and in the relay OR, and also open at bridge 211 until relay LSR moves. Relay OR has no control to deenergize 115.

(e) 202—87—216—contacts of relay OR—214 is open at bridge 211: there is no delivery of liquid.

When the label sheet has been fed until LSS changes and relay LSR moves, then II–(a) above is unchanged: II–(b) is unchanged; II–(c) changes by the said closure at LSS, and a new circuit is tentatively established:

(f) 202—115—218—OR—210—bridge 209—208 to ESS which is open and waiting for an envelope to arrive.

II–(d) becomes:

(g) 202—215—214—CSb (open or closed)—213—bridge 211—210—209—208 to ESS which is open waiting for an envelope.

II–(e) becomes:

(h) 202—87—216—OR—214—CSb (open or closed)—213 and thence as in II–(d); so that there is no delivery of liquid.

When the manual switch MES is moved, the path 202—75—204—MES—217—bridge 209 is broken, because relay LSR has moved incidental to the presence of a proper label at LSS, whereby 75 is deenergized and an envelope is permitted to feed, and thus the aforesaid conditions of full automatic operation prevail.

III

Manual envelope feed control running

This is the converse condition, in which envelopes may be fed through the machine, but without application of labels thereto. This condition is useful to the operator in permitting him to make sure that the envelope holding and feeding parts are in proper adjustment for the particular size, thickness, etc., of the envelope matter. For this, the envelope hand switch MES is in the right-hand position, just as in full automatic running, and the label hand switch MLS is moved to open position. Assuming that there are no labels in the machine, so that the label sensing switch LSS will remain open and relay LSR will not be moved by energization of the coil 220, the following and tentative circuits are established:

(a) 202—75—204—MES—217—209—207 is open at MLS.

(b) The alternative path 202—75—204—76 (if closed)—205—CSa (open or closed)—206—207 is also open at MLS. Solenoid 75 is not energized, and envelope feeding can occur.

(c) 202—115—OR—210—bridge 211—212—ESSa—207 is open at MLS; and no energization of 115 with intermittent cycling can occur thereby.

(d) 202—215—214 to 213 is open at CSb (at standstill of shaft 100) and also at OR: relay OR is not actuated, and 218—210 remain connected.

(e) With no cycling of shaft 100, there is no movement of the wetting device. Also the path 202—87—216—contacts of relays OR—214 is open as with (III–e), and no water delivery occurs.

(f) The presence of a label area and the closure of LSS does not procure any intermittent cycling, because the path 202—115—218—OR—210—bridge 209—208—ESS (open or closed)—207 is open at MLS.

In this condition, the envelopes are fed one by one, without wetting or application of labels: and the operator can adjust for proper feeding of the envelopes, whether card, empty wrapper or filled wrapper.

It will also be noted that there is a condition in which the main switch 201 has been closed, while both of the manual switches MES and MLS have been moved to the left-hand positions. With such circuit connections, the constantly driven parts operate. Thus, when the main switch 201 is closed, a circuit is established by 202—EM—203: the motor is energized and runs. However, the other circuits remain closed or open, as follows:

(a) 202—75—204—MES—203 remains closed; 75 is energized and EFF is raised to prevent envelope feed.

(b) 202—115—218—OR—210—bridge 211—212—ESSa—207 is open at MLS.

(c) 202—215—214 is open at CSb.

(d) 202—215—214 is also open in OR.

(e) 202—87—216—OR is open at CSb.

It will be understood that the specific mechanical and electrical parts and connections are set forth by way of example; and that the invention can be practiced in many ways within the scope of the appended claims.

What is claimed is:

1. The method of applying labels to articles, which comprises preparing a group of labels including labels proper for application to articles and labels improper for such application, successively advancing the labels toward a label-applying region at which the individual labels may be applied to articles, feeding articles successively toward the said region, scanning the successive labels for detecting the presence of an improper label and thereupon preventing delivery of an article to the label-applying region and moving said improper label for rejection thereof, and continuing the scanning of the advancing labels with prevention of article feeding when an improper label is detected and with the rejection of such improper label, and the advancement of articles to the region for the reception of detected proper labels.

2. A machine for applying labels to articles comprising means for advancing a label strip to a point at which the first label thereof may be applied to an article, means for feeding articles to said point, a first switch responsive to the presence of a label proper for application to an article when said label is ready for advancement to said point, intermittent cyclic driving means for actuating said label advancing means by one label area for each cycle of said driving means, a second switch responsive to the articles as they individually move toward said point, means for preventing movement of the articles into contact with said second switch, means controlled by said first switch for controlling said preventing means and effective to prevent article movement when no label is present at said first switch and when a label improper for application to an article is present at said first switch, means controlled by said second switch for procuring a cycle of movement of said label advancing means, a third switch responsive to the articles when they individually are in position for receiving labels, and means controlled by the third switch for preventing advancement of the label strip so long as an article is effective upon said third switch.

3. A machine for applying labels to articles comprising means for advancing labels to a point at which they may be applied to articles, some of said labels being proper for application to articles and others being improper for such application, means for feeding articles to said point, a normally open first switch responsive to an article being fed toward said point and means for adjustably fixing said first switch at a selected position in the path of movement of the article toward said point at which it can receive a label whereby to determine the positioning of the label along the length of the envelope, a normally closed second switch responsive to an article at said point, intermittent driving means for said label advancing means including a device for effecting cycles of movement thereof, a third switch responsive to a label which has moved to ready position preliminary to its being advanced to said point and also responsive to the label while in said ready position whereby to detect the movement of labels into the ready position and selectively determine the presence of proper and improper labels at said ready position, means connected with said first switch and said device for initiating a cycle of movement, means connected with said third switch for procuring the feeding of an article when a proper label is present at ready position and effective for preventing such article feeding movement when an improper label is present at ready position, means connected with said third switch for initiating a cycle of movement independently of the presence of an article at said first switch when an improper label is at ready position, and means connected with said second switch for preventing the initiation of a cycle of movement so long as an article is effective to operate said second switch.

4. A machine for applying labels to articles comprising a support along which a label strip may be advanced, a stub shaft extending transversely to the direction of label advancement, a roller loosely journalled on said shaft for engaging the label strip and holding the same against said support preliminary to its advancement along the support, a plate having a label guiding portion for holding the advancing strip against the support after the strip has left the roller, the plate having portions engaging said shaft for supporting the plate relative to the said support and the label strip thereon, means for engaging the label strip when beneath said label plate and advancing the strip along the support, a label sensing device mounted on said plate and including a lever, a housing having an aperture through which the label strip is advanced to a point in said housing at which it can be applied to an article, a second guide plate effective for engaging the upper surface of the label strip and guiding the same from the first said plate to said point, means on the housing for guiding said second guide plate independently of said first-named plate, said second guide plate having a recess in its upper surface, and a detaining element guided in the housing for holding said second guide plate in predetermined position, said second plate having an opening through which said lever may act for engaging the label strip at the position occupied by the last label thereof before its advancement to said point.

5. A machine for applying labels to articles comprising means for advancing labels to a point at which they may be applied to articles, means for feeding articles to and from said point, a normally open first switch repsonsive to an article being fed toward said point and means for adjustably fixing said first switch at a selected position in the path of movement of the envelope toward said point at which it can receive a label, a normally closed second switch responsive to an article at said point, intermittent driving means for said label advancing means including a device for effecting cycles of movement thereof, a label switch for determining the presence of labels which are proper for application to articles and of labels which are improper for such application, means energized from the label switch when a proper label is thereat to initiate the feeding of an article, means energized from the label switch when an improper label is thereat for initiating a cycle of movement whereby the improper label is delivered without an article being fed to receive the same and a further label advanced to the label switch, means connected with the said first switch and with said cycle-effecting device for procuring the initiation of a cycle of movement when both said first and second article responsive switches are closed, and means connected with said second switch and under control of said label switch for preventing the initiation of a cycle of movement so long as an article is present to hold said second switch in open position whereby the cycle for removing the improper label does not cause application of such improper label to an envelope being fed past said point.

6. A machine for applying labels to articles comprising means for advancing labels to a point at which they may be applied to articles moved to and from said point, a normally open first switch responsive to an article by closure when the article is approaching said point, a normally closed second switch responsive to an article by being opened when the article arrives at said point and remaining open as long as an article is at said point, intermittent driving means for said label advancing means including a device for effecting cycles of movement thereof, a label switch for determining the presence of labels which are proper for application to articles and of labels which are improper for said application, means energized from the label switch when a proper label is thereat to initiate the feeding of an article, means energized from the label switch when an improper label is thereat for initiating a cycle of movement whereby the improper label is delivered without an article being fed to receive the same and a further label advanced to the label switch, and means connected with the said article responsive switches and with said cycle-effecting device for procuring the initiation of a cycle of movement when an article is approaching said point and both said switches are closed and cooperative with said label switch for preventing the initiation of a cycle of movement during the time said second switch is held open by an article at said point.

7. A machine for applying labels to articles comprising means for advancing labels to a point at which they may be applied to articles moved to and from said point, label applying means at said point, a normally open first switch responsive to an article approaching said point and being closed thereby, a normally closed second switch responsive to an article at said point and being opened thereby and remaining open as long as an article is at said point, intermittent cyclic driving means for said label advancing and applying means including a device for effecting cycles of movement thereof, a label switch for determining the presence of labels which are proper for application to articles and of labels which are improper for such application, means energized from the label switch when a proper label is thereat to initiate the feeding of an article, means energized from the label switch when an improper label is thereat for initiating a cycle of movement whereby the improper label is delivered without an article being fed to receive the same and a further label advanced to the label switch, and means connected with the said article responsive switches and with said cycle-effecting device for procuring the initiation of a cycle of movement when both said switches are closed and cooperative with said label switch when the latter has detected an improper label for preventing the initiation of a cycle of movement during the time said second switch is held open by an article at said point.

References Cited in the file of this patent
UNITED STATES PATENTS

| | | |
|---|---|---|
| 1,002,194 | Brasseur | Aug. 29, 1911 |
| 2,196,792 | Gasca | Apr. 9, 1940 |
| 2,574,181 | Hess | Nov. 6, 1951 |
| 2,626,075 | Hesson | Jan. 20, 1953 |
| 2,639,830 | Weimont | May 26, 1953 |
| 2,725,155 | Fitch et al. | Nov. 29, 1955 |
| 2,726,003 | Govatsos | Dec. 6, 1955 |
| 2,736,378 | Sigoda et al. | Feb. 28, 1956 |
| 2,754,022 | Schneider | July 10, 1956 |